(12) United States Patent
Kneckt et al.

(10) Patent No.: US 11,304,133 B2
(45) Date of Patent: Apr. 12, 2022

(54) POWER SAVINGS FOR MULTI-LINK WIRELESS LOCAL AREA NETWORK INFRASTRUCTURE

(71) Applicant: Apple Inc., Cupertino, CA (US)

(72) Inventors: Jarkko L. Kneckt, Los Gatos, CA (US); Christiaan A. Hartman, Mountain View, CA (US); Guoqing Li, Campbell, CA (US); Jinjing Jiang, San Jose, CA (US); Qi Wang, Sunnyvale, CA (US); Su Khiong Yong, Palo Alto, CA (US); Tianyu Wu, Fremont, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 16/850,110

(22) Filed: Apr. 16, 2020

(65) Prior Publication Data

US 2021/0014784 A1    Jan. 14, 2021

Related U.S. Application Data

(60) Provisional application No. 62/873,696, filed on Jul. 12, 2019.

(51) Int. Cl.
*H04W 76/10* (2018.01)
*H04W 52/02* (2009.01)
*H04W 84/12* (2009.01)

(52) U.S. Cl.
CPC ....... *H04W 52/0209* (2013.01); *H04W 76/10* (2018.02); *H04W 84/12* (2013.01)

(58) Field of Classification Search
CPC ........... H04W 72/042; H04W 72/0446; H04W 72/1289; H04W 72/0453; H04W 76/27;
(Continued)

(56) References Cited

U.S. PATENT DOCUMENTS 9,961,137 B2    5/2018   Shaw
2003/0043773 A1 3/2003  Chang
(Continued)

FOREIGN PATENT DOCUMENTS

KR    1020140056181 A    5/2014
KR    1020180034543 A    4/2018

OTHER PUBLICATIONS

Extended European Search Report for Patent Application No. EP 20183830; datd Dec. 9, 2020; 10 Pages.

*Primary Examiner* — Daniel Lai
(74) *Attorney, Agent, or Firm* — Kowert, Hood, Munyon, Rankin & Goetzel, P.C.

(57) ABSTRACT

This disclosure relates to methods for conducting multilink communications between a user equipment device (UE) and a wireless access point (AP) over a wireless local area network (WLAN). The UE establishes a connection with an access point through a WLAN, wherein the connection utilizes a plurality of links. The UE transmits an indication to the access point through a first link of the plurality of links, where the indication specifies one or more available links of the plurality of links that are available for the UE to receive downlink (DL) communications from the access point. The UE receives one or more DL communications from the access point through at least one of the one or more available links.

20 Claims, 13 Drawing Sheets

(58) Field of Classification Search
CPC ... H04W 72/044; H04W 24/02; H04W 72/04; H04W 72/0406; H04W 72/048; H04W 72/0493; H04W 72/085; H04W 74/0816; H04W 76/15; H04W 88/08; H04W 72/10; H04W 72/14; H04W 28/0268; H04W 28/06; H04W 48/16; H04W 56/001; H04W 72/046; H04W 72/0466; H04W 72/082; H04W 72/12; H04W 72/1257; H04W 72/1273; H04W 72/1278; H04W 74/006; H04W 74/008; H04W 74/02; H04W 74/0833; H04W 76/12; H04W 76/28; H04W 84/12; H04W 28/16; H04W 28/18; H04W 72/00; H04W 72/02; H04W 72/1284; H04W 76/10; H04W 76/11; H04W 76/20; H04W 76/30; H04W 52/0209; H04W 52/0235; H04W 52/0229; H04W 52/0216; H04W 52/0248; H04W 88/02; H04W 52/34; H04W 52/0212; H04W 52/0261; H04W 52/08; H04W 52/545; H04W 52/0206; H04W 52/0277; H04W 52/146; H04W 52/16; H04W 52/32; H04W 52/36; H04W 52/365; H04W 52/367; H04W 52/54; H04L 5/0094; H04L 1/1861; H04L 5/0092; H04L 5/0096; H04L 5/0098; H04L 1/0041; H04L 1/0045; H04B 7/0417; H04B 1/0064; H04B 7/0413; Y02D 30/70
See application file for complete search history.

(56) References Cited

U.S. PATENT DOCUMENTS

| | | | |
|---|---|---|---|
| 2008/0285528 A1* | 11/2008 | Hong | H04B 7/022 370/338 |
| 2009/0116468 A1* | 5/2009 | Zhang | H04L 5/0007 370/342 |
| 2012/0322455 A1* | 12/2012 | Oh | H04L 5/001 455/450 |
| 2015/0181469 A1* | 6/2015 | Yu | H04W 28/18 370/311 |
| 2017/0208542 A1* | 7/2017 | Kim | H04W 52/02 |
| 2018/0092039 A1 | 3/2018 | Cariou et al. | |
| 2018/0160370 A1 | 6/2018 | Alpert et al. | |
| 2018/0270679 A1 | 9/2018 | Laselva et al. | |
| 2019/0069188 A1 | 2/2019 | Lumbatis et al. | |
| 2019/0158385 A1 | 5/2019 | Patil et al. | |
| 2019/0215884 A1 | 7/2019 | Patil et al. | |
| 2019/0246419 A1* | 8/2019 | Sun | H04W 8/245 |
| 2020/0120603 A1 | 4/2020 | Seok et al. | |
| 2020/0259574 A1* | 8/2020 | Huang | H04B 7/063 |

* cited by examiner

|  | 0-3 | 4-7 |
|---|---|---|
|  | Link Availability Bitmap | Reserved |
| Bits: | 4 | 4 |

FIG. 4

| | RX NSS | Channel Width | TX NSTS | UL MU Disable | UL MU Data Disable |
|---|---|---|---|---|---|
| Bits: | 4 | 3 | 4 | 1 | 1 |

POWER SAVINGS FOR MULTI-LINK WIRELESS LOCAL AREA NETWORK INFRASTRUCTURE

PRIORITY CLAIM

This application claims priority to U.S. Provisional Patent Application No. 62/873,696, titled "Power Savings for Multi-link Wireless Local Area Network Infrastructure" and filed on Jul. 12, 2019, which is hereby incorporated by reference in its entirety, as though fully and completely set forth herein.

TECHNICAL FIELD

The present application relates to wireless communication, including techniques and devices for improved performance of a user equipment device in a multi-link wireless local area network architecture.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices, or user equipment devices (UEs) may take the form of smart phones or tablets that a user typically carries. Additionally, UEs may be configured to simultaneously communicate over multiple wireless links over a wireless local area network (WLAN). Coordinating activation and deactivation of multiple wireless links may present challenges to obtain benefits of increased throughput and latency reduction while also reducing power consumption. Accordingly, improvements in the field are desired.

SUMMARY

Embodiments are presented herein of, inter alia, systems, apparatuses, and methods for devices for improved performance of a user equipment device in a multi-link wireless local area network (WLAN) environment.

A user equipment device (UE) may comprise one or more antennas, one or more radios operably coupled to the one or more antennas, and a processor operably coupled to the one or more radios. The UE may be configured to establish a connection with an access point through a wireless local area network (WLAN) over multiple wireless links. The UE may operate in each of the multiple wireless links using a respective radio of the one or more radios.

In some embodiments, the UE may transmit an indication to the access point through a first link of the plurality of links, wherein the indication specifies one or more available links of the plurality of links that are available for the UE to receive downlink (DL) communications from the access point. The UE may then receive one or more DL communications from the access point through at least one of the one or more available links. In some embodiments, the one or more available links comprise at least one link that is different from the first link.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4 is an example frame structure for indicating link availability, according to some embodiments;

FIG. 5 is an example frame structure for indicating link parameters, according to some embodiments;

Figure 1:
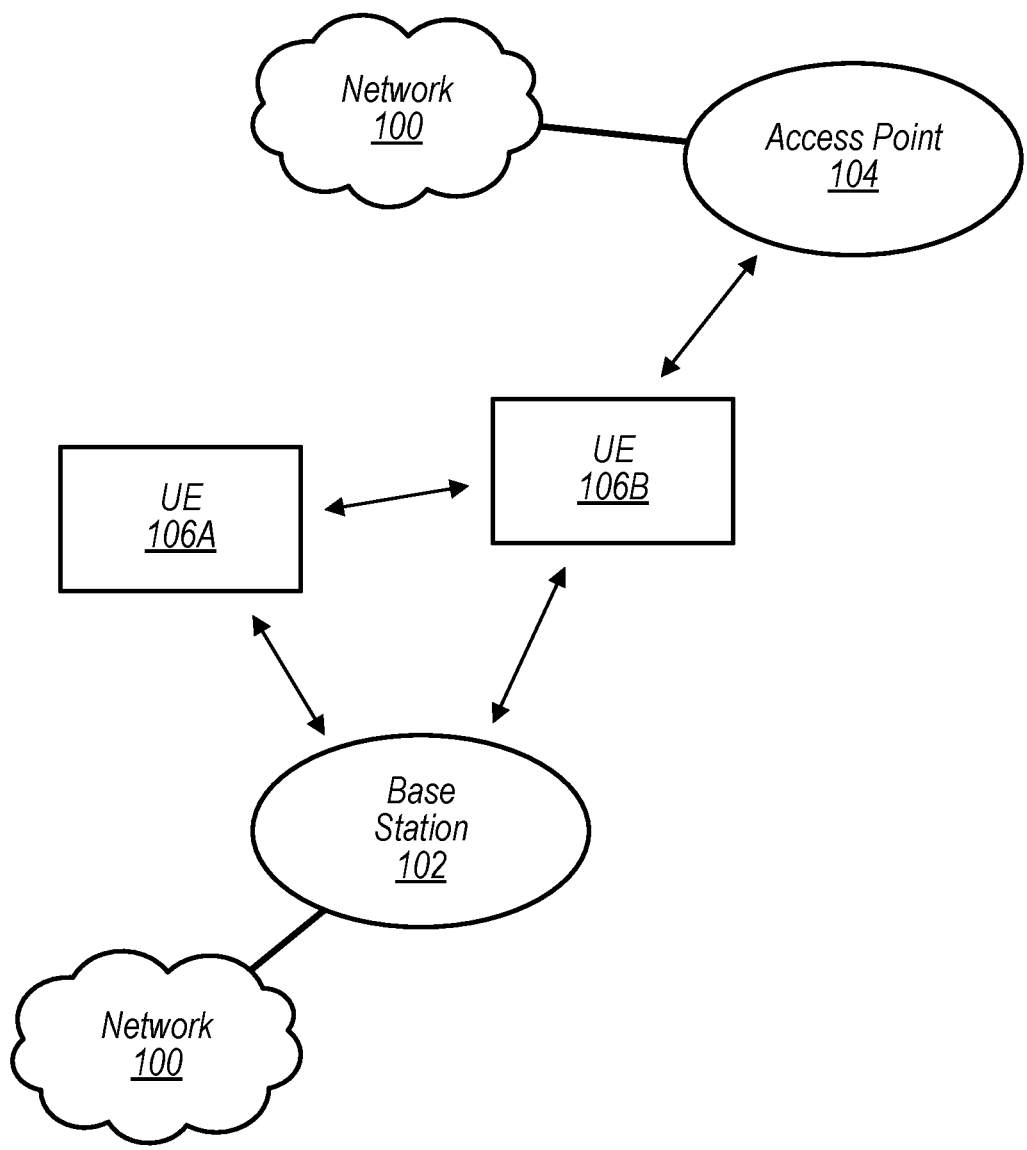
FIG. 1 illustrates an example wireless communication system including a user equipment device (UE), according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processors include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
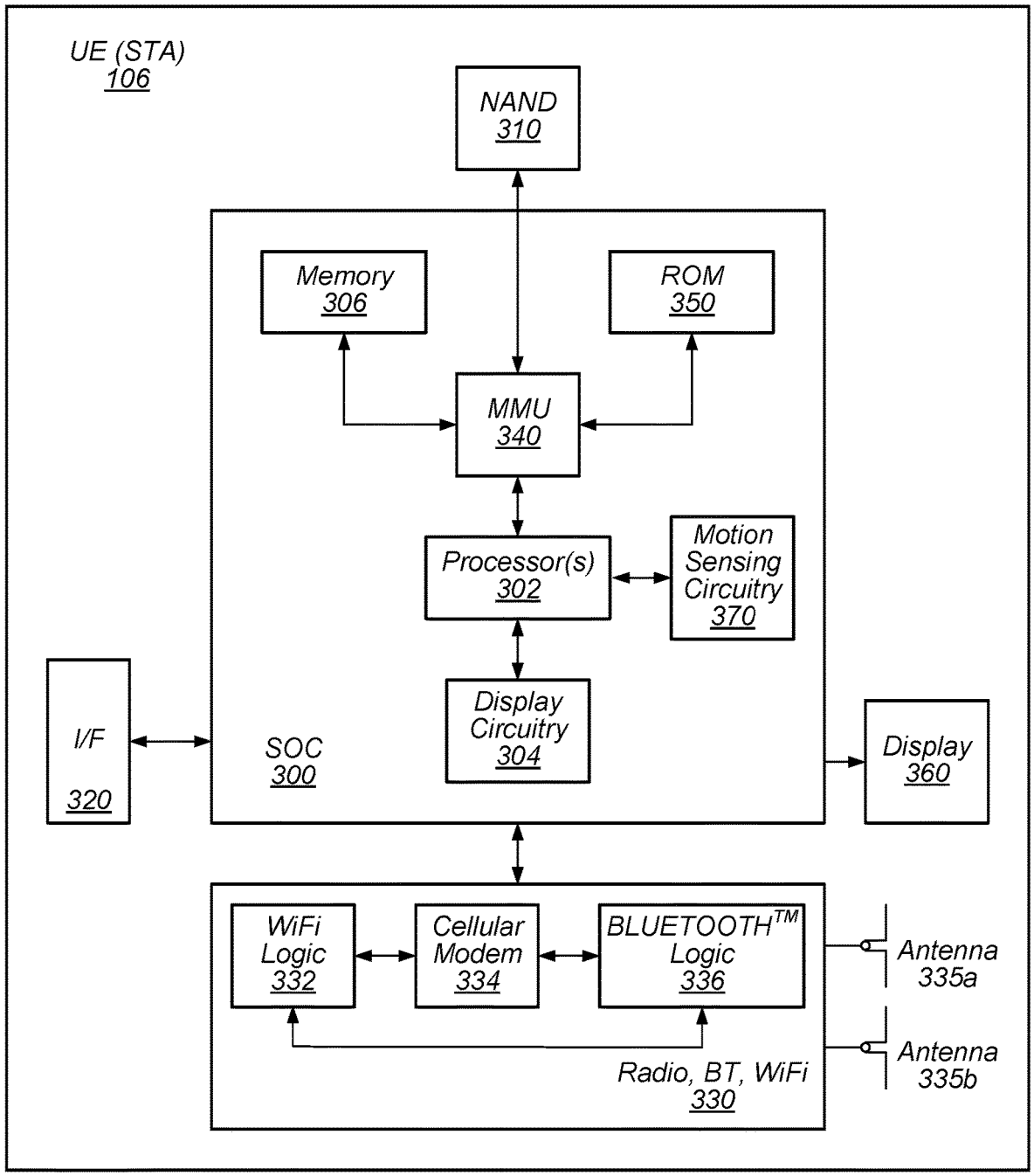
FIG. 2 is a block diagram illustrating an example UE, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc. Wireless devices 106A and 106B may be user devices, which may be referred to herein as "user equipment" (UE), UEs, or UE devices.

The base station 102 may be a base transceiver station (BTS) or cell site, and may include hardware that enables wireless communication with the UE devices 106A and 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and/or between the UE devices 106 and the network 100. In other implementations, base station 102 can be configured to provide communications over one or more other wireless technologies, such as an access point supporting one or more WLAN protocols, such as 802.11 a, b, g, n, ac, ad, ay, be and/or ax, or LTE in an unlicensed band (LAA).

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), 5G NR, HSPA, 3GPP2 CDMA2000 (e.g., 1×RTT, 1×EV-DO, HRPD, eHRPD), Wi-Fi®, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a geographic area via one or more cellular communication technologies.

Note that at least in some instances a UE device 106 may be capable of communicating using any of a plurality of wireless communication technologies. For example, a UE device 106 might be configured to communicate using one or more of GSM, UMTS, CDMA2000, LTE, LTE-A, 5G NR, WLAN, BLUETOOTH®, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

As shown, the exemplary wireless communication system also includes a WLAN access point (AP) 104, which communicates over a transmission medium with the wireless device 106B. The WLAN access point, which may be a Wi-Fi® AP, also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102.

The UE 106 may include a device or integrated circuit for facilitating cellular communication, referred to as a cellular modem. The cellular modem may include one or more processors (processor elements) and various hardware components as described herein. The UE 106 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios, each of which may be configured to communicate via a respective wireless link. Other configurations are also possible.

FIG. 2—Example Block Diagram of a UE Device

FIG. 2 illustrates one possible block diagram of an UE device, such as UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH®, Wi-Fi®, NFC, GPS, etc.).

The UE device 106 may include at least one antenna, and in some embodiments multiple antennas 335a and 335b, for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi® Logic 332, a Cellular Modem 334, and BLUETOOTH® Logic 336. The Wi-Fi® Logic 332 is for enabling the UE device 106 to perform Wi-Fi® or other WLAN communications on an 802.11 network. The BLUETOOTH® Logic 336 is for enabling the UE device 106 to perform BLUETOOTH® communications. The cellular modem 334 may be a cellular modem capable of performing cellular communication according to one or more cellular communication technologies.

As described herein, UE 106 may include hardware and software components for implementing embodiments of this disclosure. For example, one or more components of the wireless communication circuitry 330 (e.g., Wi-Fi® logic 332, cellular modem 334, BT logic 336) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 3:
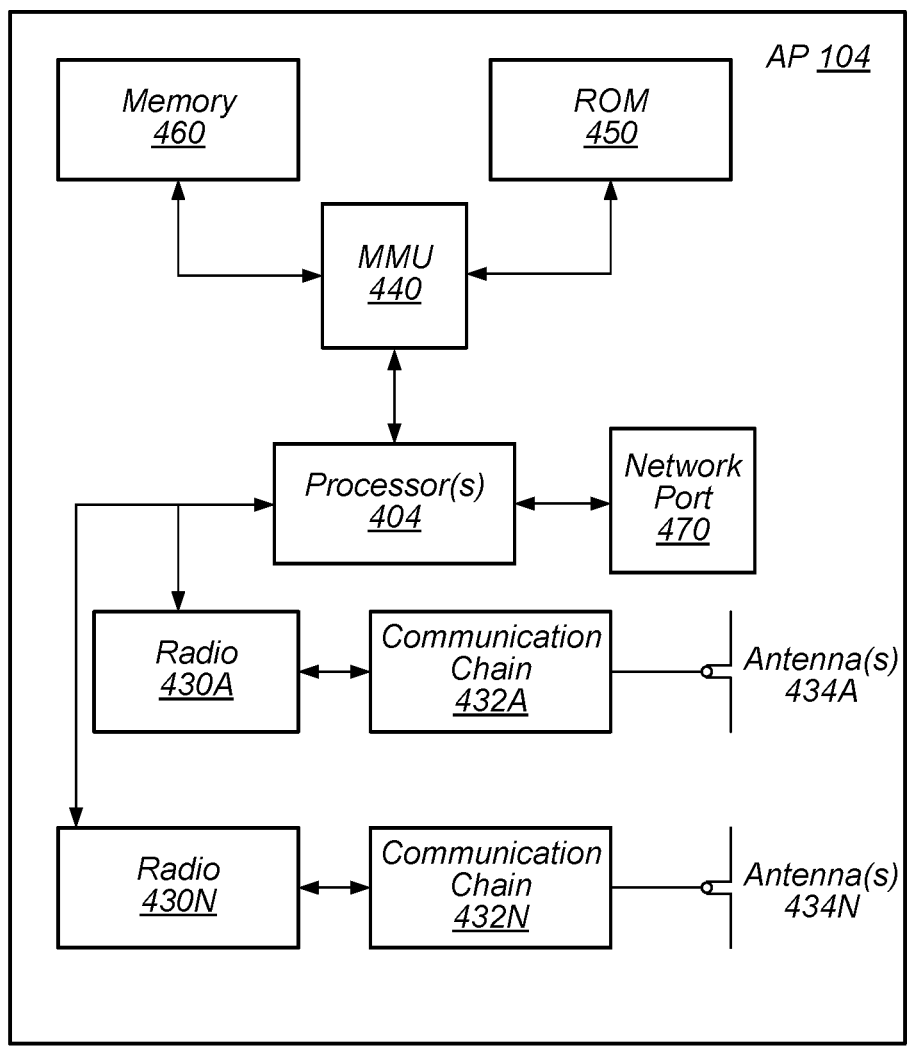
FIG. 3 is a block diagram illustrating an example network element or access point, according to some embodiments.

FIG. 3—Block Diagram of an Access Point

FIG. 3 illustrates an example block diagram of an access point (AP) 104, according to some embodiments. It is noted that the AP of FIG. 3 is merely one example of a possible access point. As shown, AP 104 may include processor(s) 404 which may execute program instructions for the AP 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The AP 104 may include at least one network port 470. The network port 470 may be configured to couple to a telephone network and provide a plurality of devices, such as UE devices 106, access to the telephone network as described above in FIG. 1.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The AP 104 may include one or more radios 430A-430N, each of which may be coupled to a respective communication chain and at least one antenna 434, and possibly multiple antennas. The antenna(s) 434 may be configured to operate as a wireless transceiver and may be further configured to communicate with UE devices 106/107 via radio 430. The antenna(s) 434A-N communicate with their respective radios 430A-N via communication chains 432A-N. Communication chains 432 may be receive chains, transmit chains, or both. The radios 430A-N may be configured to communicate via various wireless communication standards, including, but not limited to, LTE, LTE-A, NR, GSM, UMTS, CDMA2000, Wi-Fi®, etc. The UE 104 may be configured to operate in multiple wireless links using the one or more radios 430A-N, wherein each radio is used to operate in a respective wireless link.

The AP 104 may be configured to communicate wirelessly using multiple wireless communication standards. In some instances, the base station 102 may include multiple radios, which may enable the network entity to communicate according to multiple wireless communication technologies. For example, as one possibility, the AP 104 may include an LTE or 5G NR radio for performing communication according to LTE as well as a Wi-Fi® radio for performing communication according to Wi-Fi®. In such a case, the AP 104 may be capable of operating as both an LTE base station and a Wi-Fi® access point. As another possibility, the AP 104 may include a multi-mode radio which is capable of performing communications according to any of multiple wireless communication technologies (e.g., NR and Wi-Fi®, NR and UMTS, LTE and CDMA2000, UMTS and GSM, etc.). As still another possibility, the AP 104 may be configured to act exclusively as a Wi-Fi® access point, e.g., without cellular communication capability.

As described further subsequently herein, the AP 104 may include hardware and software components for implementing or supporting implementation of features described herein. The processor 404 of the access point 104 may be configured to implement or support implementation of part or all of the methods described herein, e.g., by executing program instructions stored on a memory medium (e.g., a non-transitory computer-readable memory medium) to operate multiple wireless links using multiple respective radios. Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the AP 104, in conjunction with one or more of the other components 430, 432, 434, 440, 450, 460, 470 may be configured to implement or support implementation of part or all of the features described herein.

DETAILED DESCRIPTION

It is anticipated that upcoming implementations of wireless local area networks (WLANs) may utilize multiple links during communications between a wireless station (STA), such as a UE 106 as illustrated in FIG. 2, and a wireless access point (AP) such as the AP 104 illustrated in FIG. 3, in either or both of uplink and downlink communications. The STA may be any of a variety of types of wireless stations, including but not limited to a UE 106, a smart phone, tablet, personal computer, smart watch, accessory device, or any other type of wireless device capable of communicating over a WLAN.

While the 802.11ax standard allows a STA and an AP to communicate according to either a 5 GHz link or a 2.4 GHz link, for example, it is anticipated that 802.11.be may allow a STA and an AP to communicate over multiple links simultaneously, including the 2.4 GHz and 5 GHz links as well as other link (e.g., 6 GHz), to improve throughput and reduce communication latency. For example, a single connection between a STA and an AP may utilize multiple wireless links, each of which operates within the same or a different frequency band. Embodiments herein propose infrastructure power saving mechanisms and other enhancements for a STA operating in multiple links, which may be asynchronous links.

Operating in multiple links may shorten transmission delays, as the associated AP and the STA simultaneously communicate on multiple links and transmissions may be performed over the first available link (e.g., rather than having to wait for a particular link to become available, which may be temporarily congested or otherwise unavailable). Accordingly, a single congested link may be prevented from severely increasing transmission delays, and the duration of transmission delays may be shortened. Additionally, multiple link operation introduces power consumption considerations, as STA power consumption may vary depending on the number of spatial streams and the size of the operating bandwidth. Depending on the STA configuration, operation over multiple links may consume more power than operation over a single link.

To obtain the latency benefits of multiple link operation while mitigating against excess power consumption, it may be desirable for the STA to be able to quickly activate multiple and/or all of its links to shorten transmission delays, to increase UL and DL throughput, and to avoid a single link bottleneck. For example, selected links may be quickly activated to improve throughput capacity according to the quality of service (QoS) needs of an application currently running on the STA. Further, in some embodiments it may be desirable for some or all available links to be quickly deactivated, to enter a "doze" or low power state when utilization of multiple links is no longer necessary. Additionally, in some embodiments it may be desirable to avoid situations where a STA cannot return to a doze state because it is waiting to receive transmissions over a single poorly performing link. Embodiments herein present devices and mechanisms to address these and other concerns.

In some embodiments, a STA uses a Power Management field in the media access control (MAC) headers to indicate whether it is in active mode or power save mode. In active mode the STA may operate in an awake state, while in power save (PS) mode the STA may alternatively operate in either an awake or a doze state. While in the PS mode, the STA may use various mechanisms such as PS-Poll and/or unscheduled automatic power save delivery (U-APSD) mechanisms in order to receive buffered downlink (DL) frames from the AP. Alternatively or additionally, to receive DL frames in PS mode, the STA may set up individual target wakeup times (TWTs) to be available on TWT service periods which periodically repeat.

In some embodiments, the STA may indicate whether it is operating in power save mode using a single bit in the Power Management field in the MAC Header. For example, the STA may set a power mode (PM) indicator PM=0 to indicate it is in active mode and PM=1 to indicate it is in power save mode.

In some embodiments, the STA may dynamically signal its availability for each link in which the STA is capable of operating, with one bit designated per link. For example, for each of a plurality of links that are available for the STA to operate through, the STA may signal a value of zero to indicate that the STA is not currently available to receive DL transmissions in the respective link, and may signal a value of one to indicate that the STA is currently available to receive DL transmissions in the respective link. FIG. 4 illustrates an example frame structure for implementing this indication, according to some embodiments. As illustrated, bits 0-3 of the eight-bit frame are utilized to indicate availability of 4 different links, while the remaining four bits 4-7 are reserved.

In some embodiments, this signaling may be done in new A-Control subfield called Link Availability Control. In some embodiments, at any given time, the non-AP STA may have at least one link available. The AP may transmit DL frames to the STA only on the links in which the STA is available, while the STA may be configured to transmit UL frames to the AP in all links, regardless of whether STA is available for the link.

In some embodiments, while the STA is in active mode, the STA may be in the awake state in all links in which the STA is available. While the STA is in the power save mode, the STA may be in either the awake or doze state in all links in which the STA is available.

If the STA operates in power save mode, the STA may utilize PS-Poll, U-APSD or TWT to obtain DL frames from the AP. For example, if the AP receives a PS-Poll frame from the STA, the AP may transmit a single DL physical payload data unit (PPDU) in any of the links in which the STA is available. If the AP receives an automatic power save delivery (APSD) trigger frame from the STA, the AP may transmit buffered DL frames in any of the links in which the STA is available. The last transmitted DL PPDU may contain an end of service period (EOSP) field set to 1, to indicate that it is the last DL PPDU.

In other embodiments, the STA may signal its availability for each link in which the STA operates by using the Operating Mode Indication field A-Control field. The operating mode indication may include the link number and the operating bandwidth field may have the option for a zero MHz channel width. In these embodiments, the link may be set to a zero MHz operating channel width to indicate that the link is not available.

The number of spatial streams (NSSs), BW and other parameters of a given link may be changed at the same time when the link is indicated as available. For example, the A-control field may be used to indicate different channel width values. As one example, a mapping may be utilized whereby 0 corresponds to a 20 MHz channel width, 1 indicates 40 MHz, 2 indicates 80 MHz, 3 indicates 160 MHz, 4 indicates 240 MHz, 5 indicates 320 MHz, 6 is reserved, and 7 indicates that the link is not used. Other mappings are also possible, as desired. A bit frame structure corresponding to these embodiments is illustrated in FIG. 5, where for a particular link, four bits are allocated for a receiver (RX) NSS indication, three bits are utilized to indicating channel width of the link, four bits are utilized for indicating transmission (TX) number of spacetime streams (NSTS), and a single bit is utilized for indicating whether each of all UL multi-user (MU) data transmissions responsive to a trigger frame and all UL MU data transmissions responsive to a trigger frame are disabled.

In other embodiments, the AP may have a link-specific PM bit value. In these embodiments, the STA may configure the PM bit value by using the Power Management field in each link to indicate whether the STA operates in active mode or in power save mode in the respective link. If the link is in active mode, then the STA may operate in the awake state for the respective link, while if the link is in power save mode, the STA may utilize U-APSD or PS-Poll in the link to receive DL frames. Each link may follow the PM mode, U-APSD triggers and PS-Poll frames that are transmitted in the link. In other words, power saving mechanisms in each link may operate independently. Further, in some embodiments, the STA may set up link-specific individual TWT agreements and schedule TWT service periods (SPs) for each link separately.

Figure 6:
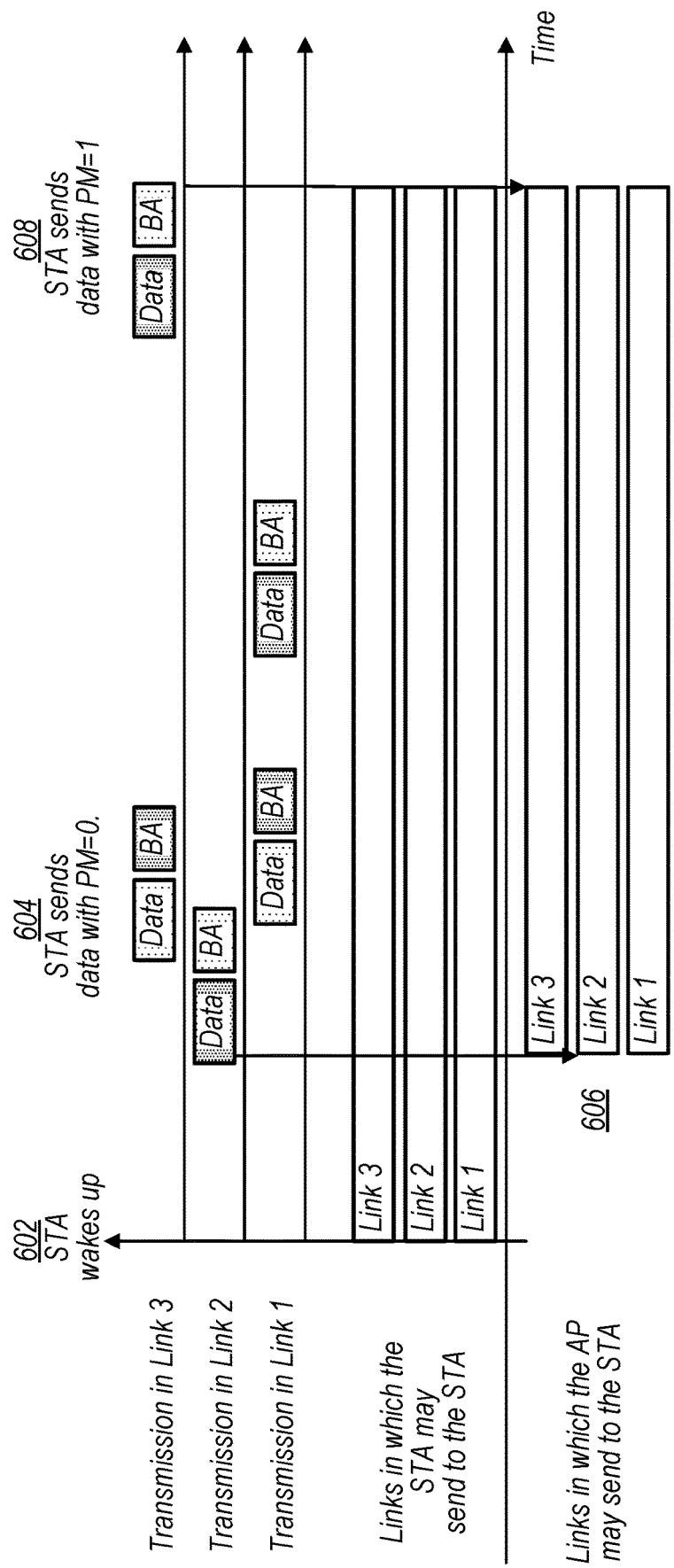
FIG. 6 is a communication flow diagram illustrating a dynamic link activation procedure, according to some embodiments.

FIG. 6 is a communication flow diagram illustrating a dynamic link activation procedure, according to some embodiments. As illustrated, at 602, the STA wakes and starts to communicate on all available links (e.g., as illustrated, the STA communicates on links 1, 2, and 3). At 604, the STA transmits data with PM=0 in link 2. At 606, the AP receives the message with PM=0 in link 2, and thereby detects that the STA is in active mode. Accordingly, the AP may send frames to the STA in any available link. At 608, the STA transmits a PPDU over link 3 with PM=1. When the AP has acknowledged the PPDU, the STA may return to a doze state and the AP may refrain from transmitting DL frames to the STA over links 1-3.

Figure 7:
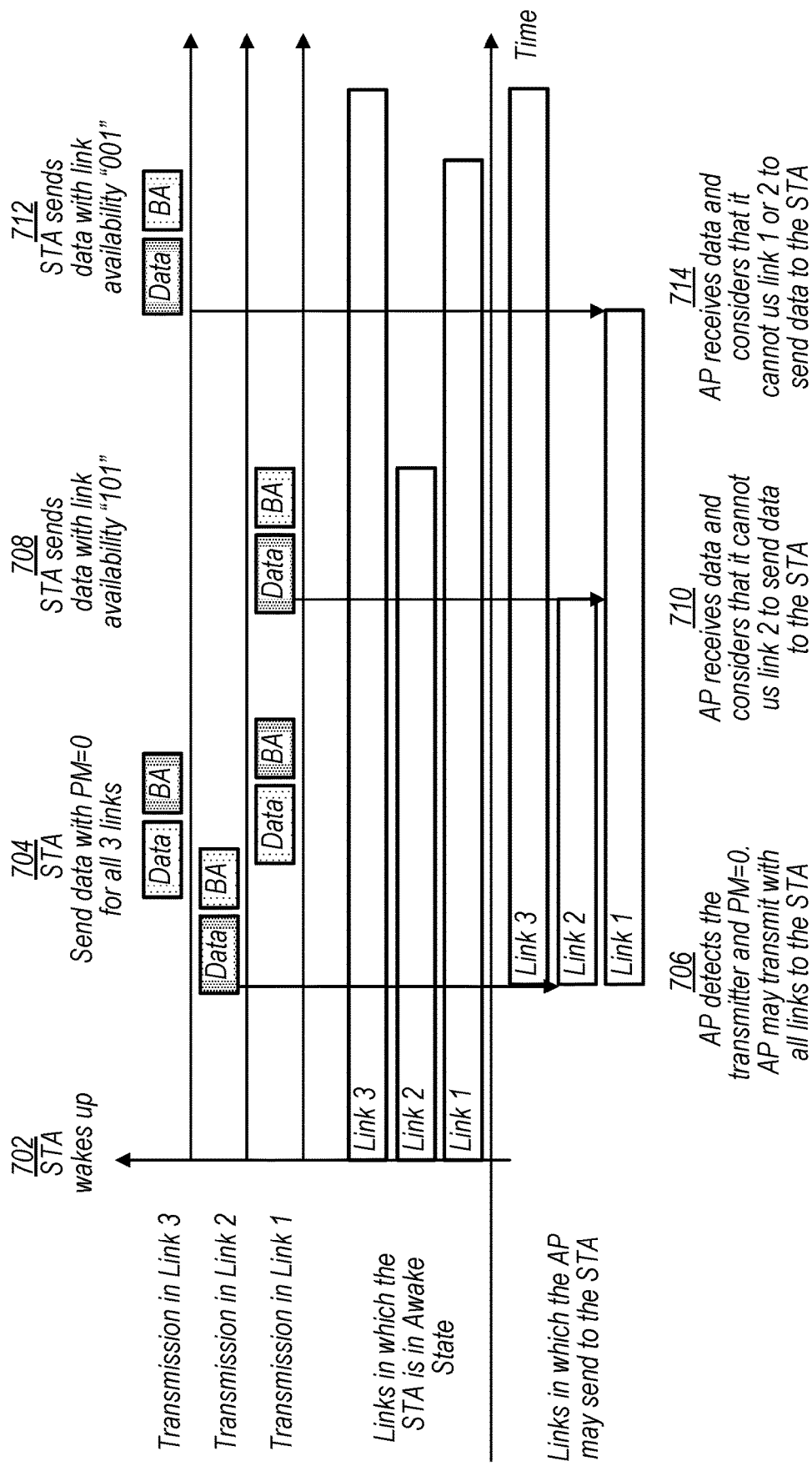
FIG. 7 is another communication flow diagram illustrating a dynamic link activation procedure, according to some embodiments.

FIG. 7 is another communication flow diagram illustrating a dynamic link activation procedure, according to some embodiments.

Steps 702-706 are similar to the steps 602-606 described above in reference to FIG. 6. At 708, the STA utilizes a Link Availability Control (LAC) subfield set equal to "101" to signal that it is available in links 1 and 3 but is not available in link 2. At 710, when the AP detects that the STA is not available in link 2, it may refrain from initiating new transmission opportunities (TXOPs) to transmit DL frames to the STA over link 2. At 712, the STA may send another data message with the LAC subfield set to "001", indicating that neither links 1 nor 2 are available while link 3 remains available. At 714, upon receiving the LAC subfield, the AP may refrain from initiating new TXOPs to transmit DL frames to the STA over links 1 or 2.

In some embodiments, communications between the STA and the AP on multiple links may each specify a value for the PM field, which may potentially be different from each other. In various embodiments, mechanisms may be employed to assist the AP in determining which of several (potentially conflicting) PM values received from a STA should be used to determine the PM mode of the STA.

Figure 8:
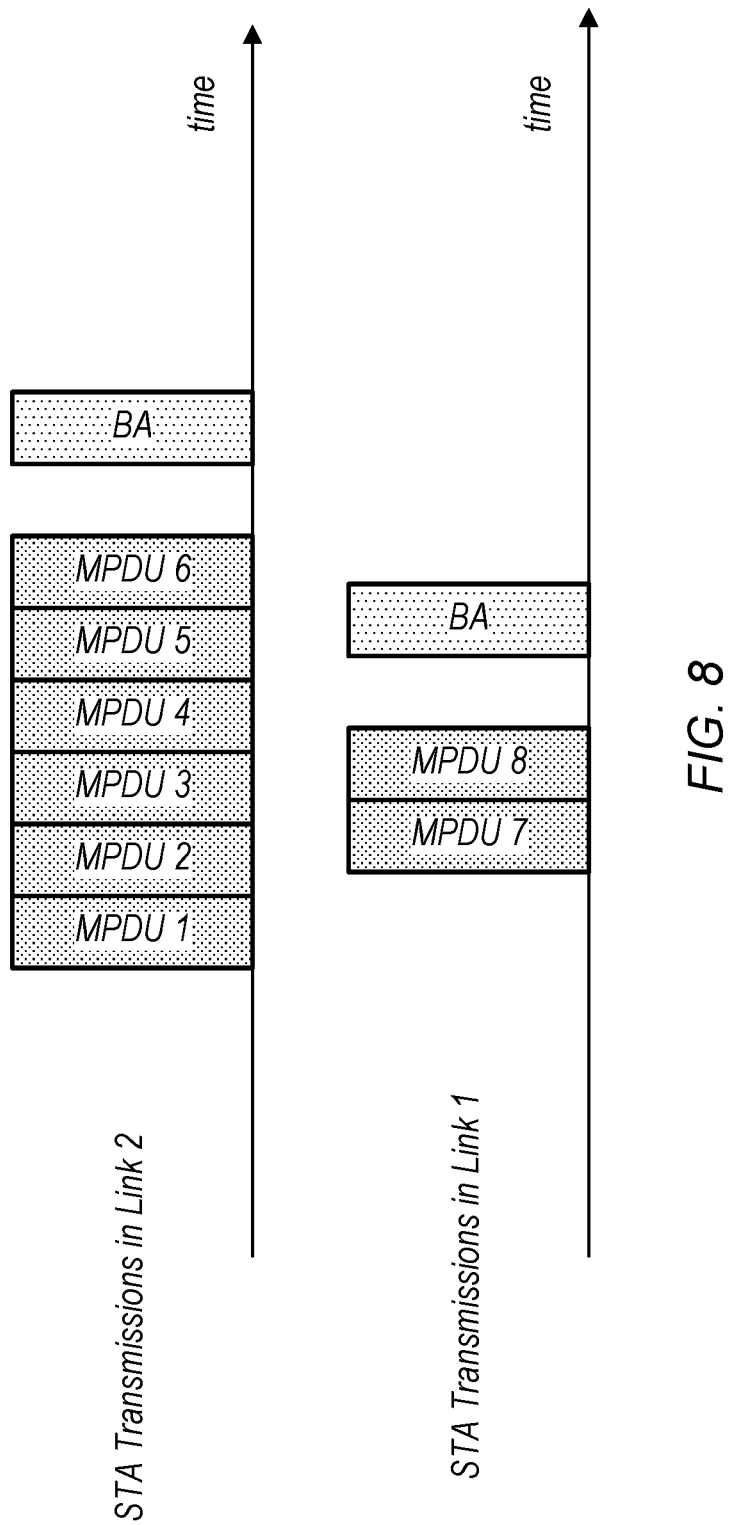
FIG. 8 is a communication flow diagram illustrating a sequence of media access control (MAC) payload data unit (MPDU) transmissions over two links, according to some embodiments.

In some embodiments, the PM field of a message (such as a physical payload data unit (PPDU)) transmitted by the STA and received by the AP whose transmission started most recently may be utilized to indicate to the AP whether the STA is in active or power save mode. For example, as illustrated in FIG. 8, the PM value of the media access control (MAC) payload data units (MPDUs) in link 1 may be used by the AP to determine the PM mode of the STA since the MPDU transmissions over link 1 were initiated more recently than the MPDU transmissions over link 2.

In other embodiments, the last PM field value which the AP has received may be used to indicate to the AP whether the STA is in active or power save mode. For example, in these embodiments, the communication diagram illustrated in FIG. 8 may cause the AP to rely on the PM value of MPDU 6 in link 2 to determine the PM mode of the STA, since the last MPDU sent over link 2 (i.e., MPDU 6) is received after the last MPDU sent over link 1 (i.e., MPDU 8).

In some embodiments, when the AP receives a PM value of 1 from the STA, if the AP is transmitting frames to the STA in one or more asynchronous links, the AP may finish the transmission opportunity (TXOP) in the one or more links, and may consider the STA to be in power save mode after the current TXOP is completed. In these embodiments, the AP may not initiate a new TXOP in any link after receiving the PM=1 indication.

In some embodiments, a STA may not be able to control the transmission order of the PPDUs in the different links. For example, if one or more links become congested and/or radio conditions are changing, transmissions in the links may occur at dynamically changing intervals and the transmission order over the links may unpredictably change over time. To address these and other complications, some embodiments utilize one or more of the following mechanisms when sending frames that change the value of the PM field. In some embodiments, when the PM field value associated with a first link is changed from 1 to 0, all transmitted MPDUs over all active links may have their PM value set to 0, to provide expedited link activation. On the other hand, if the STA transmits a frame that changes the PM field value from 0 to 1, if the STA knows that the MPDUs in the transmission buffer are the last transmitted PPDUs, or that the STA intends to go to a doze state soon, then the STA may apply PM=1 on all remaining frames in the transmission buffer. On the other hand, if the STA transmits a frame that changes the PM field value from 0 to 1 and there will be more data transmitted after the transmitted frame, (i.e. if an application running on the STA likely or often generates more traffic, or the QoS requirements do not allow any additional delays), the STA may apply a no-transmission timeout value. Then, if no UL packets are received for transmission during the timeout period, the STA may send a QoS-Null frame in a link and may transition to the power save mode In some embodiments, the AP may receive PM bits only on a single link, i.e. the AP may ignore PM bit values in all other links except for one particular link, to avoid confusion about which PM value should take precedence.

In some embodiments, the links may have precedence order for PM value selection. For instance, if links 1 and 3 are having simultaneously ongoing transmissions, then the PM bit value in link 1 may be used to define whether the STA is in active mode or in power save mode.

Figure 9:
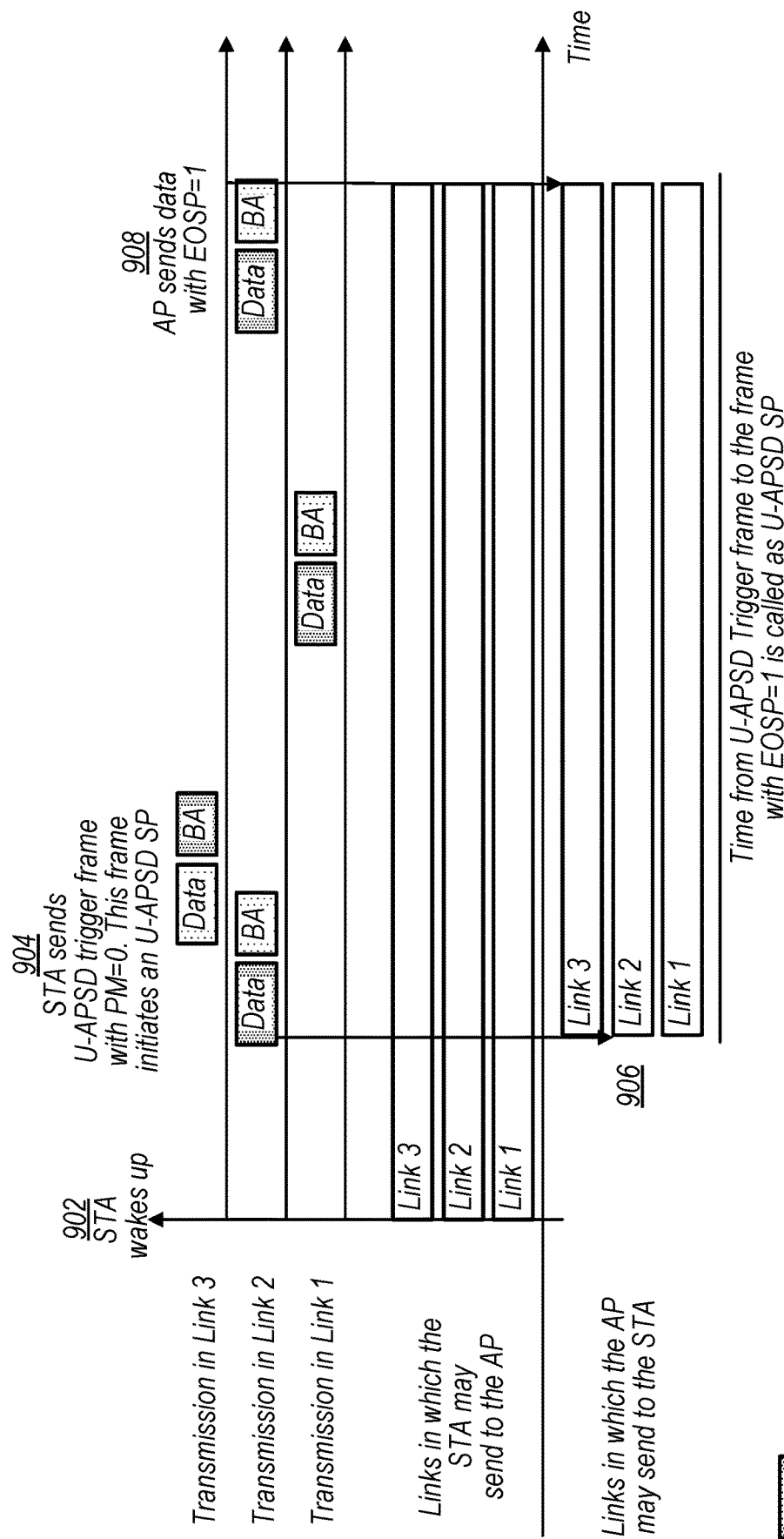
FIG. 9 is a communication flow diagram illustrating an example of unscheduled automatic power save delivery (U-APSD) Service Period (SP) configuration in a multi-link basic services (BSS) communication between a STA and an AP, according to some embodiments.

FIG. 9—U-APSD Service Period Configuration

FIG. 9 is a communication flow diagram illustrating an example of U-APSD Service Period (SP) configuration in a multi-link basic services (BSS) communication between a STA and an AP. As illustrated, the STA may wake up at 902, and at 904 it may send a U-APSD trigger frame with PM=0 to initiate an U-APSD SP. When the AP receives the trigger frame, it may consider the STA active on all three links 1-3, and may enable transmissions to the STA over these links for the illustrated period of time. Finally, at 908, the STA transmits data with an end-of-service period (EOSP)=1 indicator, indicating the end of the SP.

The AP may transmit the frame with EOSP=1 in any link in which the STA is available. After the AP has transmitted the frame with EOSP=1 to the STA, the AP may finish the ongoing TXOPs and the AP may not initiate new TXOPs with the STA. In some embodiments, if the AP does not receive an acknowledgement or a blockAck from the frame with EOSP=1, the AP may retransmit only once the frame in any link in which the STA is available, but the AP may not retransmit more than once.

Figure 10:
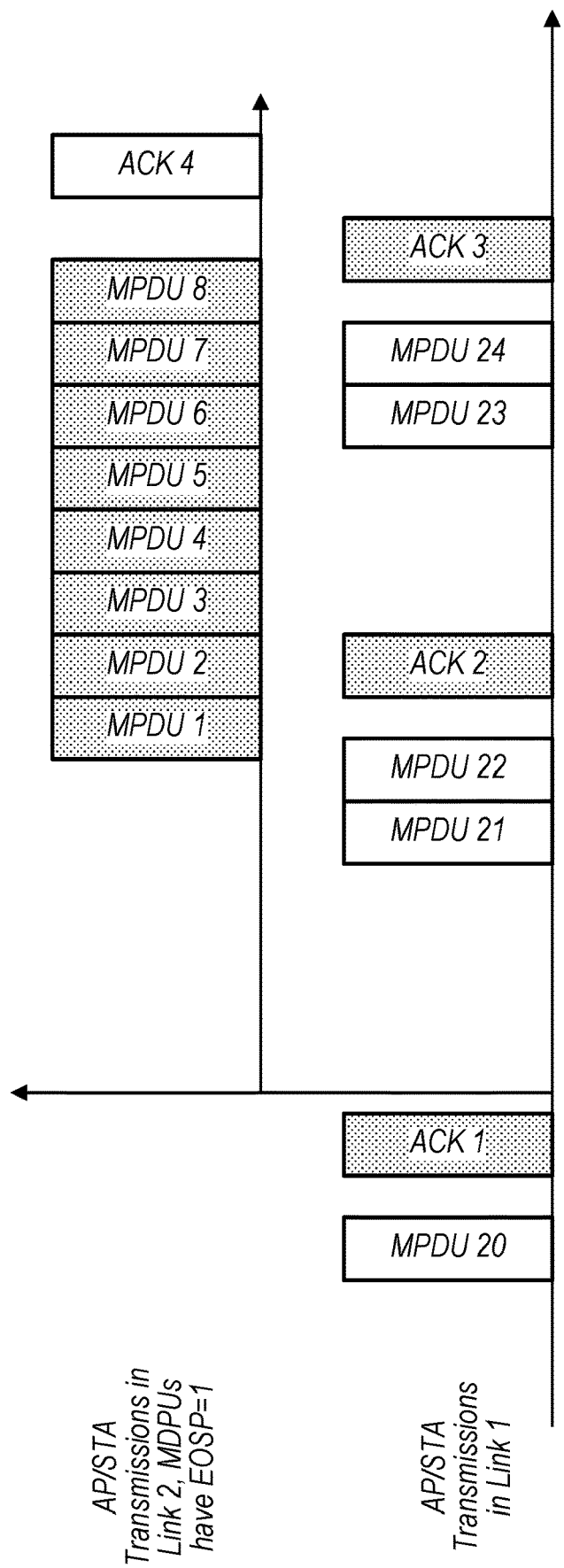
FIG. 10 is a communication flow diagram illustrating another sequence of MPDU transmissions over two links, according to some embodiments.

In some embodiments, the AP may consider a frame to be an U-APSD trigger frame only if the frame is transmitted in a TXOP initiated after the ACK/BA is received corresponding to the frame that contained an EOSP=1 indication. This embodiment is illustrated in FIG. 10, where shaded blocks indicate UL transmissions (i.e., transmissions from the STA to the AP, which may be either MPDU blocks or ACK messages), while unshaded blocks indicate DL transmissions (i.e., transmissions from the AP to the STA, which may likewise be either MPDU blocks or ACK messages). In some embodiments, an UL MPDU transmission that is transmitted after a DL ACK may be treated as a new SP trigger frame by the AP. For example, in FIG. 10, an UL MPDU transmission that is received after ACK 4 may be treated by the AP as a new SP trigger frame.

Alternatively, in other embodiments, the AP may consider a frame to be an U-APSD trigger frame only if the PPDU carrying the frame is transmitted after transmission of a PPDU that carries EOSP=1. For example, in reference to FIG. 10, the PPDU carrying DL MPDUs 23 and 24 over link 1 may be considered to be an U-APSD SP trigger frame by the AP because it is transmitted after the EOSP=1 indication is transmitted over link 2 (e.g., in MPDUs 1-8), thus starting a new U-APSD SP.

The PS-Poll power save mechanisms in a BSS with multiple links may adversely affect delay performance. For example, the PS-Poll may allow the AP to send only a single DL PPDU, since before transmitting each DL frame the STA may need to send a separate PS-Poll frame. Additionally, UL PS-Poll transmission delays may dominate DL transmission delays, and asynchronous links may not significantly improve DL transmission delays. To address these and other concerns, various enhancements may be utilized to control the links in which the AP is able to send DL data to the STA after it has received a PS-Poll, according to various embodiments.

Figure 11:
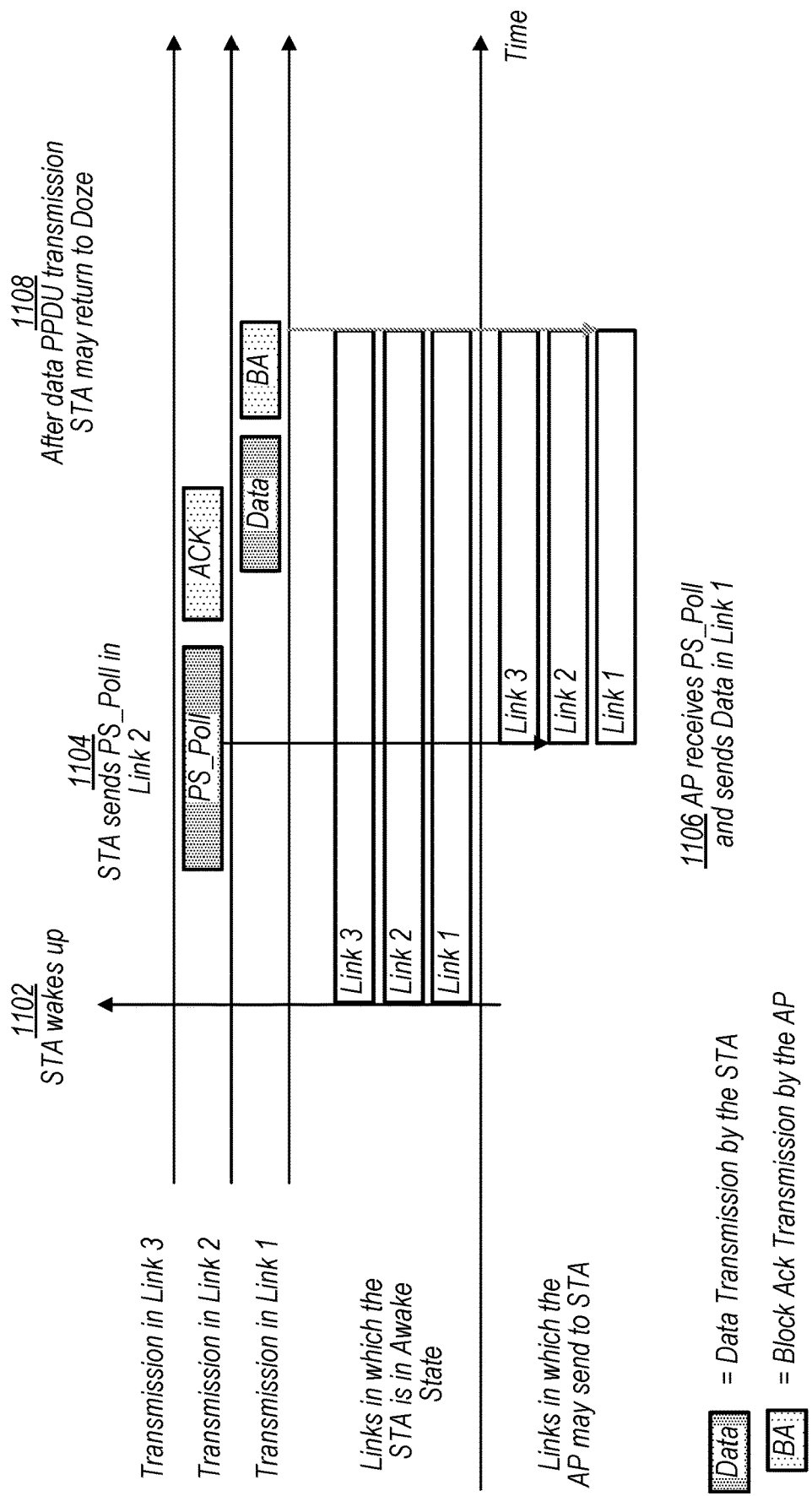
FIG. 11 is a communication flow diagram illustrating Power Save (PS)-Poll utilization in a multiple-link communication session, according to some embodiments.

First, in some embodiments, an AP that receives a PS-Poll may transmit the DL PPDU in any link in which the STA is available. For example, this is similar to the U-APSD operation in multi-link BSS. This embodiment is illustrated in FIG. 11, wherein the STA wakes up at 1102 and send a PS-Poll in link 2 at 1104. The AP receives the PS-Poll at 1106 and sends DL data over any available link (e.g., link 1 as illustrated in FIG. 11, though any available link may be used).

Figure 12:
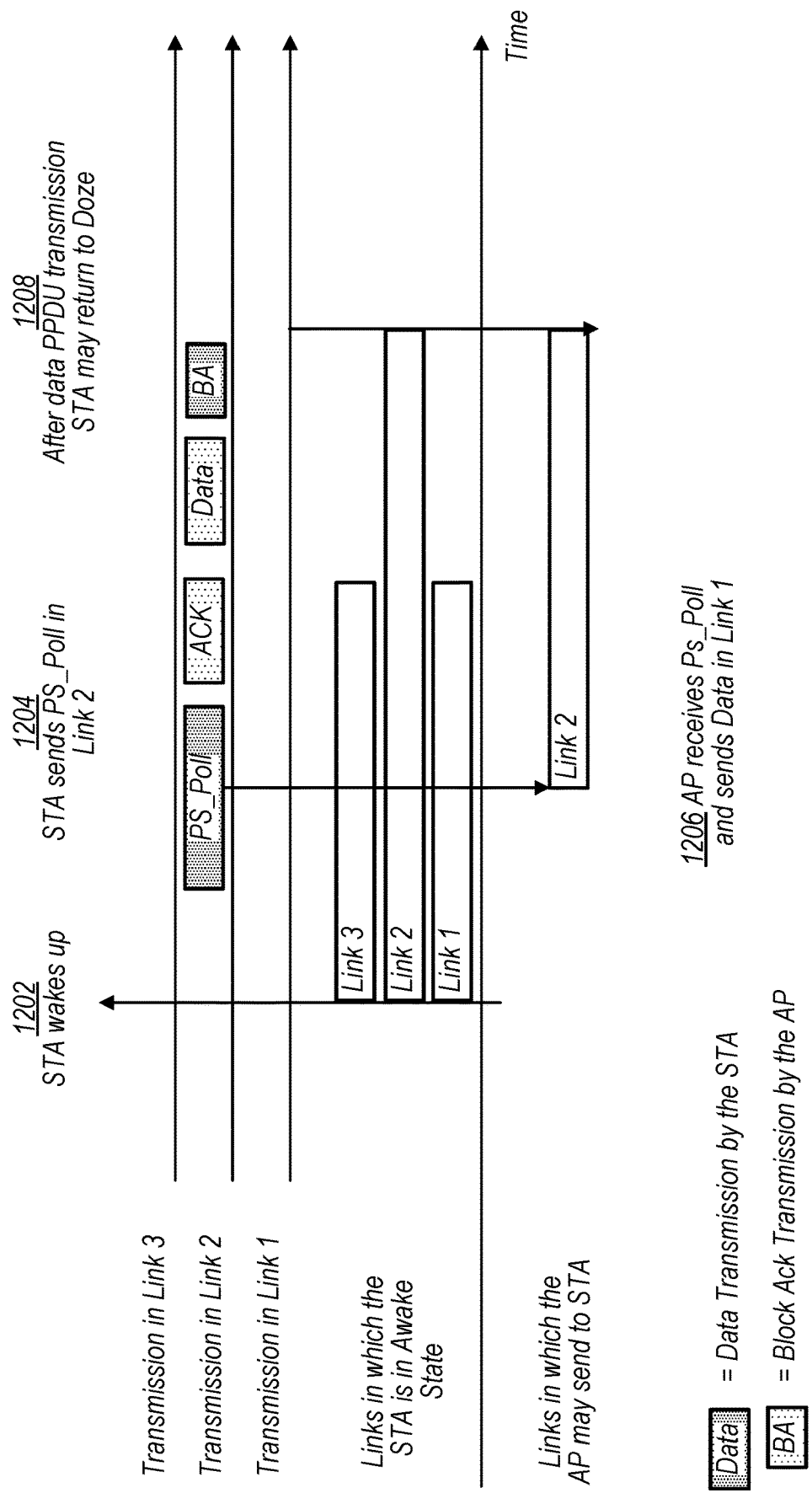
FIG. 12 is a communication flow diagram illustrating an alternative PS-Poll utilization in a multiple-link communication session, according to some embodiments.

Alternatively, in other embodiments, the AP that received the PS-Poll frame may transmit the DL PPDU on the same link in which it received the PS-Poll frame. The STA may control the number of activated links, but the delay and throughput performance of PS-Poll transmission scheme may be much lower than in active mode/PS-Mode transitions. This embodiment is illustrated in FIG. 12, wherein the STA wakes up at 1202, sends a PS-Poll in link 2 at 1204, and the AP receives the PS-Poll at 1206 and sends DL data over the same link, link 2. In other words, the AP may send a PPDU as a response to PS-Poll only on the link it has received the PS-Poll. For example, the STA may communicate on a TXOP in any of links 1-3. However, after transmitting the PS_Poll over link 2 the STA may only operate over link 2.

In current implementations, individual target wakeup time (TWT), broadcast TWT, and scheduled APSD are defined in WLAN Standards to provide power saving mechanisms for STA-AP communications. Of these mechanisms, individual TWT may allow the most flexibility for the non-AP STA and AP to enable power savings for specific links at specific times. The individual TWT agreement defines periodically repeating TWT Service Periods (SPs) when a STA is available to receive transmissions from the AP. The periodically repeating TWT SPs may not offer the best delay performance, because the scheduled operating times repeat periodically and the AP may not be able to transmit to the STA outside of the TWT SPs. In individual TWT implementations, large transmitted PPDU sizes may be used to maintain transmission efficiency, as the AP may aggregate all packets that have arrived during the time when STA is not available for receiving PPDUs. For example, individual TWT is well suited for streaming applications, where the shortest transmission delay is not needed for the desired application QoS. Use of multiple links in individual TWT implementations may offer more deterministic delay performance, as a single busy channel may not add transmission delay or prevent frames transmission in a TWT SP, since other channels may be utilized to avoid potential delays.

In some embodiments, the TWT setup signaling may be performed over any of the multiple links available to the STA. A TWT identifier (ID) value may identify the particular TWT agreement. For an individual TWT SP, a field in the TWT setup signaling may specify the links in which the data is transmitted during the TWT SP.

In some embodiments, as a first configuration, the individual TWT setup signaling may specify the links in which the STA and AP may transmit during the TWT SP, and the TWT Setup signaling may configure the STA to be available at all links or only on subset of the links. Typically, a STA may be available at least on the primary channel of a link, but individual TWT may allow a STA to be configured to receive and transmit in the secondary channels of one or more links.

In other embodiments, as a second configuration, the individual TWT agreement may specify only the times when the TWT SPs occur. For example, the TWT SPs may occur on the links in which the STA is available during the TWT SP. In other words, a STA may use the link availability subfield to configure the links in which the AP may transmit DL frames.

In various embodiments, the TWT SP may be configured to be either announced or unannounced. For example, for an unannounced TWT SP, the AP may transmit data to the STA immediately when the TWT SP is initiated. Alternatively, other embodiments may utilize an announced TWT SP, wherein the AP may first receive an announcement frame from the STA before the AP may send data to the STA. If the TWT SP is announced, the AP and STA may configure the link in which the AP may send a trigger to the STA. In other words, the trigger may be transmitted in the configured link, not in any available link. Advantageously, the STA may use this option to reduce its power consumption, as the STA is initially available in only one link. However, transmission of the trigger frame on a single link may increase transmission delays.

Figure 13:
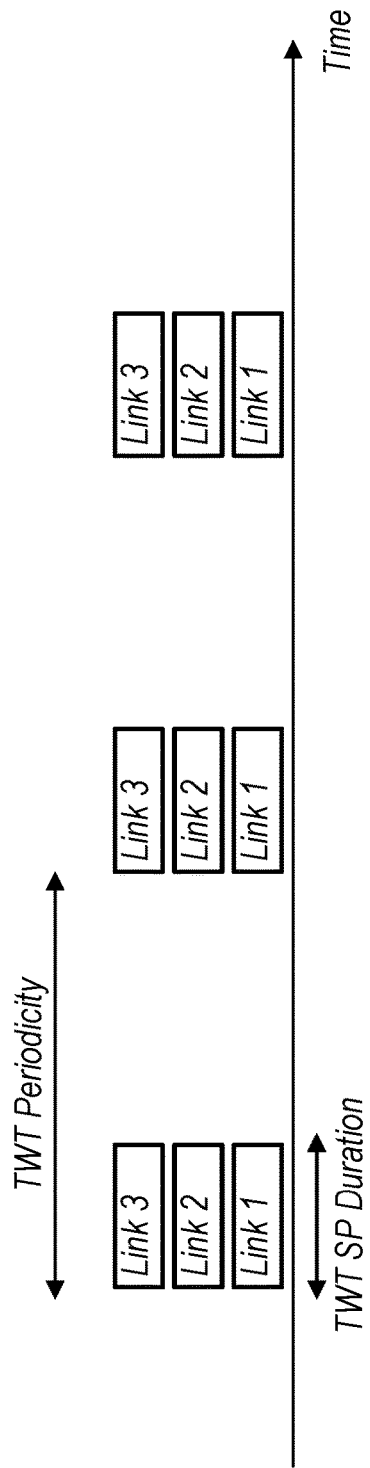
FIG. 13 is a schematic diagram illustrating an exemplary implementation of a TWT procedure, according to some embodiments.

FIG. 13 is a schematic diagram illustrating an exemplary implementation of a TWT procedure, according to some embodiments. As illustrated, the STA configures links 1, 2, and 3 to be used in TWT agreement with a specified TWT periodicity and TWT SP duration. As illustrated, each of the three links 1-3 may be activated for the TWT SP duration at intervals separated by the TWT periodicity. Note that, if STA has additional links beyond links 1-3, these links may not be activated during the TWT SPs.

Figure 14:
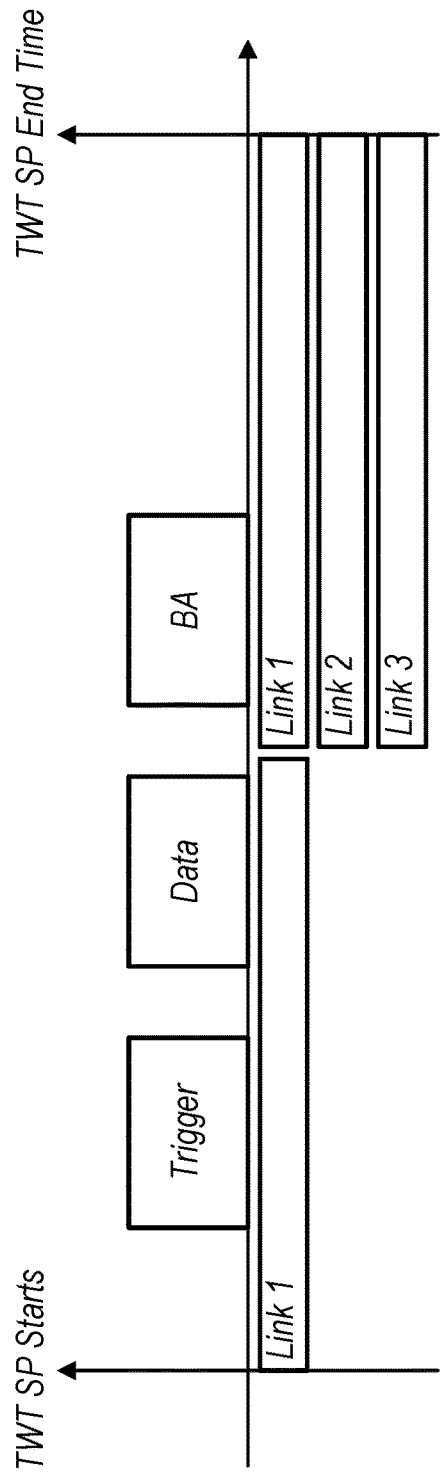
FIG. 14 is another schematic diagram illustrated another exemplary implementation of a TWT procedure, according to some embodiments.

FIG. 14 is another schematic diagram illustrating another embodiment of a TWT procedure. As illustrated, if link 1 is configured as an initiation link, then the AP may send a trigger frame on this link to check whether the STA is available. If the STA sends a response to the trigger frame, or if the STA transmits a frame in any link, the AP may proceed to transmit over all links that are included in the TWT agreement for the TWT SP duration (e.g., until the TWT SP end time illustrated in FIG. 14). The same TWT SP duration may be used in all links of the TWT agreement, and operation in all links may end at the same time. In both unannounced and announced TWT without an initiation link, all links may be available for the TWT SP duration.

FIG. 15—Flowchart

Figure 15:
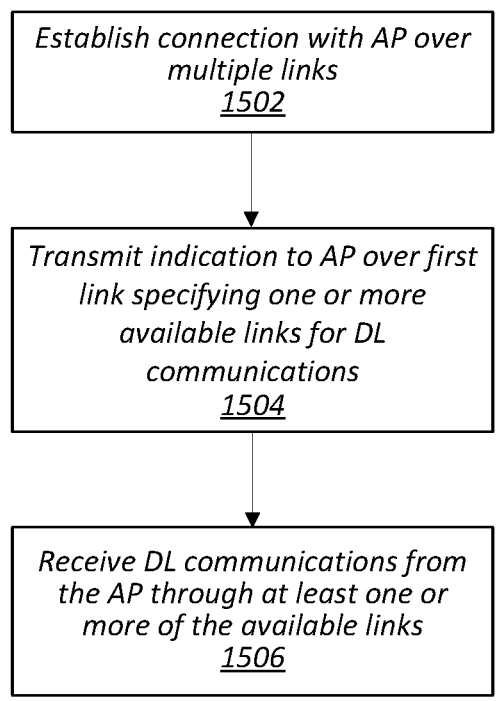
FIG. 15 is a flowchart diagram illustrating a method for communicating over a wireless local area network using multiple links, according to some embodiments.

FIG. 15 is a flowchart diagram illustrating a method for communication between a wireless station (STA) such as a UE 106 and a wireless access point (AP) such as the AP 104 over a WLAN using multiple wireless links, according to some embodiments. In various embodiments, some of the elements of the methods shown may be performed concurrently, in a different order than shown, may be substituted for by other method elements, or may be omitted. Additional method elements may also be performed as desired. As shown, the method may operate as follows.

At 1502, a STA may establish a connection with an AP through a wireless local area network (WLAN). The UE may establish a connection with an access point using any or all of BLUETOOTH®, Wi-Fi®, near field communication (NFC), and/or any of various other possible short-range communication protocols, according to various embodiments. Additionally, the UE may be capable of performing cellular communication according to 3G, LTE, and/or 5G NR radio access technologies, according to some embodiments. The connection may utilize a plurality of links in one or more separate frequency bands (e.g., a 2.4 GHz link, a 5 GHz link, and/or other wireless links).

At 1504, the UE may transmit an indication to the access point through a first link of the plurality of links, wherein the indication specifies one or more available links of the plurality of links that are available for the UE to receive downlink (DL) communications from the access point. In some embodiments, the one or more available links include at least one link that is different from the first link.

The indication may further specify one or more unavailable links of the plurality of links that are not available for the UE to receive downlink communications from the access point. In some embodiments, the UE may be configured to transmit uplink communications to the access point via one or more of the unavailable links. For example, even though the indicated unavailable links are not available for the AP to transmit DL communications, the UE may still utilize these links for UL communications to increase throughput flexibility. An AP is often plugged into a power source, such that reducing energy consumption may be less important for the AP, and the AP may be configured to continually monitor for UL messages on each of the plurality of links, whether they are available or unavailable for DL communications.

At 1506, the UE may receive one or more DL communications from the access point through at least one of the one or more available links. As described in greater detail above, the DL communications may be transmitted according to power save polling (PS-Poll), unscheduled automatic power save delivery (U-APSD), or target wakeup times (TWTs) (e.g., if the UE is in a power save mode), or the DL communications may be spontaneously transmitted as needed by the AP (e.g., if the UE is in active mode).

In some embodiments, the indication includes a bit field, wherein each bit of the bit field indicates whether a respective link of the plurality of links is available for the UE to receive downlink communications from the access point. In some embodiments, the indication further specifies an operating bandwidth for one or more respective links of the plurality of links, and a null specified bandwidth may be utilized to indicate unavailability of a particular link. In some embodiments, the indication further specifies a duration of time for which the one or more available links are available for the UE to receive DL communications from the access point. For example, the indication may specify a duration of a transmission opportunity (TXOP) for which the one or more available links are available.

In some embodiments, the UE may transmit a second indication to the access point that one or more of the available links are no longer available to receive downlink communications from the access point. For example, based on current throughput requirements of the UE (e.g., based on current applications or application types running on the UE, quality of service requirements, buffer status, and/or other criteria), the UE may transmit the second indication to indicate unavailability of one or more links that were previously indicated as available for DL communications, to preserve power.

In some embodiments, the UE may further indicate to the AP, through one of the plurality of links, whether the UE is in an active mode or a power save mode. This indication, referred to herein as a power mode (PM) indication, may be included as part of the first indication on the first link, or it may be transmitted as a second indication on the first or a different link of the plurality of links. In some embodiments, indicating whether the UE is in the active mode or the power save mode includes indicating, for each respective link of the plurality of links, whether the UE is in the active mode or the power save mode for the respective link. In other words, power save mode may be implemented on a per-link basis.

In some embodiments, the AP may receive multiple indications form the UE indicating whether the UE is in active mode or power save mode, which may conflict with one another, and the AP may implement one of the following methodologies to determine which indication to rely on as indicating the UE power status mode. In some embodiments, the AP may simply rely on the most recently received PM indication to determine the power status mode of the UE. In other embodiments, the AP may rely on the PM indication that is received during a most recently initiated transmission opportunity to determine the power status mode of the UE. For example, if a first PM indication is received during a first transmission opportunity that was initiated after a second transmission opportunity associated with a second PM indication, the AP may use the first PM indication to determine the power status mode of the UE.

As described in greater detail above, a variety of power saving methods may be implemented while the UE is in power save mode. For example, as described in greater detail above, while the UE is in power save mode, the UE may be configured to receive DL communications from the access point by utilizing one or more of power save polling (PS-Poll), unscheduled automatic power save delivery (U-APSD), or target wakeup times (TWTs), which may be announced or unannounced TWTs and/or broadcast or individual TWTs. In some embodiments, when the AP receives a PM indication that switches from active mode to power save mode, the AP may finish transmissions associated with a current transmission opportunity and refrain from initiating a new transmission opportunity.

In some embodiments, the UE may be configured to determine that a first link of the plurality of links has switched from being indicated as being in the active mode to being indicated as being in the power save mode, or vice versa. In response to this determination, the UE may switch the indication for all links as being in the power save mode or the active mode, respectively. For example, because the order of successful transmission of different links may dynamically change depending on buffer status and/or transmission failures, a switch in the power mode status of a particular link (e.g., from active mode to power save mode or from power save mode to active mode) may cause the UE to switch the indication for all links to the new power mode status of the particular link, to ensure that the power mode status change is quickly communicated to the AP.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
one or more radios operably coupled to respective antennas; and
a processor operably coupled to the one or more radios;
wherein the UE is configured to:
  establish a connection with an access point through a wireless local area network (WLAN), wherein the connection utilizes a plurality of links;
  transmit an indication to the access point through a first link of the plurality of links, the indication specifying one or more available links of the plurality of links, wherein the one or more available links are available for the UE to receive downlink (DL) communications from the access point; and
  receive one or more DL communications from the access point through at least one of the one or more available links,
wherein the indication comprises a bit field, and
wherein a bit of the bit field indicates whether a respective link of the plurality of links is available for the UE to receive downlink communications from the access point.

2. The UE of claim 1,
wherein the one or more available links comprise at least one link that is different from the first link.

3. The UE of claim 1,
wherein the UE is further configured to:
transmit a second indication to the access point indicating at least one of the one or more of the available links that is no longer available to receive downlink communications from the access point.

4. The UE of claim 1,
wherein the indication further specifies one or more unavailable links of the plurality of links, wherein the one or more unavailable links are not available for the UE to receive downlink communications from the access point, and
wherein the UE is configured to:
transmit uplink communications to the access point via at least one of the one or more unavailable links.

5. The UE of claim 1,
wherein the UE is further configured to:
transmit a second indication to the access point, through one of the plurality of links, indicating whether the UE is in an active mode or a power save mode,
wherein, when the UE is in power save mode, the UE is configured to receive DL communications from the access point by utilizing one or more of:
power save polling (PS-Poll);
unscheduled automatic power save delivery (U-APSD); or
target wakeup times (TWTs).

6. The UE of claim 5,
wherein indicating whether the UE is in the active mode or the power save mode comprises indicating, for a respective link of the plurality of links, whether the UE is in the active mode or the power save mode for the respective link.

7. The UE of claim 6,
wherein the UE is further configured to:
determine that the first link of the plurality of links has switched from the active mode to the power save mode, and
wherein indicating whether the UE is in the active mode or the power save mode for the respective link further comprises indicating that each link of the plurality of links is in the power save mode based at least in part on determining that the first link of the plurality of links has switched from the active mode to the power save mode.

8. The UE of claim 6,
wherein the UE is further configured to:
determine that the first link of the plurality of links has switched from the power save mode to the active mode, and
wherein indicating whether the UE is in the active mode or the power save mode for the respective link further comprises indicating that the respective link is in the active mode based at least in part on determining that the first link of the plurality of links has switched from the power save mode to the active mode.

9. The UE of claim 1,
wherein the indication specifies an operating bandwidth for one or more respective links of the plurality of links, and
wherein a null specified bandwidth indicates unavailability of the respective link.

10. The UE of claim 1,
wherein the indication further specifies a duration of time for which the one or more available links are available for the UE to receive DL communications from the access point.

11. A wireless access point (AP), comprising:
one or more radios; and
a processor coupled to the one or more radios, wherein the AP is configured to:
establish a connection with a user equipment device (UE) through a wireless local area network (WLAN), wherein the connection utilizes a plurality of links;
receive an indication from the UE through a first link of the plurality of links, the indication specifying one or more available links of the plurality of links, wherein the available links are available for the AP to transmit downlink (DL) communications to the UE; and
transmit one or more DL communications to the UE through at least one of the one or more available links,
wherein the indication comprises a bit field, and
wherein a bit of the bit field indicates whether a respective link of the plurality of links is available for the AP to transmit downlink communications to the UE.

12. The AP of claim 11,
wherein the one or more available links comprise at least one link that is different from the first link.

13. The AP of claim 11, wherein the AP is further configured to:
receive a second indication from the UE, through the first link, indicating whether the UE is in an active mode or a power save mode.

14. The AP of claim 13, wherein the AP is further configured to:
receive a third indication from the UE, after the second indication and through a second link of the plurality of links, indicating whether the UE is in the active mode or the power save mode; and
determine whether the UE is in the active mode or the power save mode based on the third indication.

15. The AP of claim 13, wherein the AP is further configured to:
receive a third indication from the UE, through a second link of the plurality of links, indicating that the UE is in the active mode, wherein the third indication is received during a first transmission opportunity after reception of the second indication; and
determine that the UE is in the active mode based on the third indication and responsive to receiving the third indication during the first transmission opportunity after reception of the second indication.

16. The AP of claim 13,
wherein the second indication indicates that the UE is switching from the active mode to the power save mode, wherein the AP is further configured to:
complete, based at least in part on receiving the second indication, at least one transmission associated with a current transmission opportunity; and
refrain from initiating a new transmission opportunity.

17. The AP of claim 11,
wherein, when the UE is in a power save mode, the AP is configured to transmit DL communications by utilizing one or more of:
power save polling (PS-Poll);
unscheduled automatic power save delivery (U-APSD); or
target wakeup times (TWTs).

18. A method for operating a user equipment device (UE) to communicate over a plurality of links, the method comprising:
- establishing a connection with an access point through a wireless local area network (WLAN), wherein the connection utilizes the plurality of links;
- transmitting an indication to the access point through a first link of the plurality of links, the indication specifying one or more available links of the plurality of links, wherein the one or more available links are available for the UE to receive downlink (DL) communications from the access point; and
- receiving one or more DL communications from the access point through at least one of the one or more available links,
- wherein the indication comprises a bit field, and
- wherein a bit of the bit field indicates whether a respective link of the plurality of links is available for the UE to receive downlink communications from the access point.

19. The method of claim 18,
- wherein the one or more available links comprise at least one link that is different from the first link.

20. The method of claim 18, the method further comprising:
- transmitting a second indication to the access point indicating at least one of the one or more of the available links that is no longer available to receive downlink communications from the access point.

* * * * *